United States Patent [19]

Rodgers, III

[11] 4,268,866
[45] May 19, 1981

[54] PEAK-RESPONSE CONTROLLER FOR AVERAGE-RESPONDING AUTOMATIC IRIS

[75] Inventor: Robert L. Rodgers, III, Lancaster, Pa.

[73] Assignee: RCA Corporation, New York, N.Y.

[21] Appl. No.: 93,013

[22] Filed: Nov. 9, 1979

[51] Int. Cl.................................................H04N 5/26
[52] U.S. Cl. ....................................................358/228
[58] Field of Search .........................................358/228

[56] References Cited

U.S. PATENT DOCUMENTS

| | | | |
|---|---|---|---|
| 2,885,471 | 5/1979 | King | 178/7.1 |
| 3,555,181 | 1/1971 | Thommem | 358/228 |
| 3,691,302 | 9/1972 | Gaebele et al. | 178/7.2 |
| 3,767,853 | 10/1973 | Bendell et al. | 178/7.2 |
| 4,050,085 | 9/1977 | Prince et al. | 358/228 |

Primary Examiner—John C. Martin
Attorney, Agent, or Firm—Eugene M. Whitacre; Paul J. Rasmussen; William H. Meise

[57] ABSTRACT

A commercial automatic-iris lens assembly responds to the average value of the video signals applied to its control input. For use in industrial and surveillance camera applications, the video signals applied to the control input of the automatic iris from an image sensor are passed through a controllable-gain amplifier. The gain of the amplifier is controlled in response to the peak value of the video signals produced by the image sensor to provide an effective peak responding iris.

3 Claims, 1 Drawing Figure

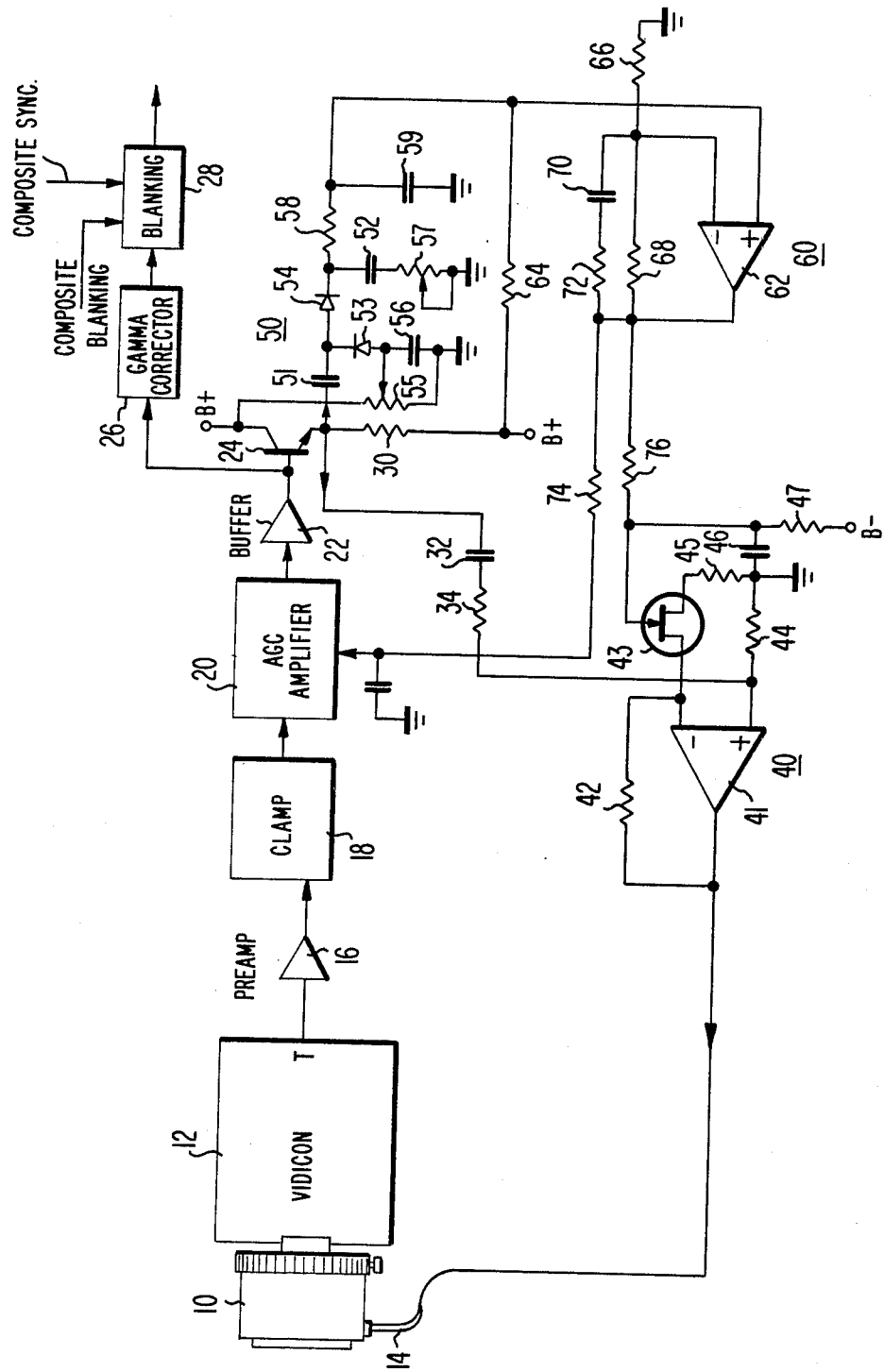

PEAK-RESPONSE CONTROLLER FOR AVERAGE-RESPONDING AUTOMATIC IRIS

BACKGROUND OF THE INVENTION

This invention relates to a drive circuit for an average-responding automatic iris for a television camera for providing a peak-responsive control characteristic.

In the surveillance and industrial camera field, an extremely wide range of ambient light conditions may be encountered by a camera in the course of operation. For example, a camera which is used for surveillance may be subjected to high levels of illumination during daytime conditions and extremely low levels of illumination on overcast nights. The imagers used for such cameras include devices such as vidicons and solid state sensors known generally as CCD sensors. Such imagers have a relatively limited dynamic range. An automatic iris control is described in U.S. Pat. No. 2,885,471 issued in the name of G. King on May 5, 1959. Such an iris is coupled to the optical path of the imager and is connected in a degenerative feedback loop which maintains the output of the imager within a relatively constant range. The King arrangement generates a control signal in response to the peak-to-peak value of the video signal. Thus, when the sensing device views a scene containing highlights, the control circuit senses the highlights and closes the iris so the highlight region has adequate contrast.

In the surveillance and industrial camera market, it is desirable that a camera be adaptable for use with standard optical systems. Such optical systems may include zoom type telephoto lenses, light amplification devices and the like. Among the optical devices currently enjoying widespread use is the Cosmicar auto-iris "ES" series lenses developed by Cosmicar Optical Company Limited of 424, Higashi-Oizumi, Nerima-Ku, Tokyo, Japan. This automatic iris is desirable because of its quality optics and wide range of control. However, the ES lenses include internal circuitry which responds to the average value of the video signal produced by the camera. Such average-responsive automatic irises respond to general scene illumination but ignore highlight areas. This may be disadvantageous for particular applications in which the highlight areas include desired information. Heretofore, it has not been possible to use ES lenses in applications in which general scene illumination is low by comparison with the highlight areas, and it is desired to have contrast in the highlight areas.

SUMMARY OF THE INVENTION

A drive circuit for a television camera automatic iris assembly in which the automatic iris assembly responds to the average value of a video signal included in an iris control signal coupled to a control terminal for maintaining a constant amplitude of the video signal. The drive circuit includes an image sensor optically coupled to the iris for producing video signals. A detector which includes a peak detection mode is responsive to the video signals for producing a direct control signal. An integrator is coupled to the detector for integrating the direct control signal to form an integrated control signal. A controllable gain video amplifier is coupled to the integrator, and the control terminal of the automatic iris to the image sensor for receiving video signals for controlling the amplitude of the video signals applied to the control terminal with a peak responsive mode for providing the average responding automatic iris with a peak-responding characteristic.

DESCRIPTION OF THE DRAWING

FIG. 1 is a diagram in block and schematic form of a preferred embodiment of the invention.

DESCRIPTION OF THE INVENTION

FIG. 1 illustrates generally at upper left of FIG. 1 an automatic iris 10 coupled to a vidicon 12. The output of the vidicon is applied to a control circuit at the right of FIG. 1 which produces video signals, the amplitude of which is controlled with a peak-responsive characteristic for application to a control input 14 of automatic iris 10.

Video signals appearing at the output terminal T of vidicon 12 are applied by way of a preamplifier 16 to clamping circuits illustrated as a block 18 for dc restoration. The dc restored video signals are coupled from clamp 18 to an automatic gain control (AGC) amplifier illustrated as a block 20. The video signals are coupled from dc amplifier 20 through a buffer amplifier 22 to the base of a transistor 24 and to gamma correction circuitry illustrated as a block 26. Gamma corrected signals are coupled to circuits 28 for blanking and addition of composite sync signals. The blanked video signals with added sync are then coupled to utilization means, not shown.

Transistor 24 is coupled with a resistor 30 as an emitter-follower. Video signals are coupled from the emitter of transistor 24 through a blocking capacitor 32 and a resistor 34 to the noninverting input of an AGC amplifier designated generally as 40. Video signals are coupled from the emitter of transistor 24 to a detector designated generally as 50. Capacitors 51 and 52 of detector 50 act in conjunction with diodes 53 and 54 as a peak-to-peak detector. The anode of diode 53 is coupled to the slider on a potentiometer 55 coupled between a source of B+ and ground. Potentiometer 55 applies a bias voltage to the anode of diode 54 which determines the signal voltage at which diodes 53 and 54 begin to conduct, and therefore establishes the video level above which detector 50 detects. Potentiometer 55 is decoupled from the video signals by a capacitor 56 coupled between its slider and ground. A variable resistor is coupled in series with capacitor 52 for controlling the detection mode of detector 50. When resistor 57 has a low resistance, capacitor 52 is readily charged in response to transient peaks in the magnitude of the video signal, whereby detector 50 has a peak-responsive characteristic, and when resistor 57 has a relatively large resistance, capacitor 52 cannot respond to transient peaks, whereby detector 50 takes on an average-responsive characteristic. A further integrator including a resistor 58 and a capacitor 59 responds to the direct control signal formed across capacitor 52 and couples it to the noninverting input of a further integrator circuit designated generally as 60. Integrator 60 includes an amplifier 62 which may be of the operational type. The noninverting (+) input terminal is coupled by a resistor 64 to B−. The inverting input is coupled to ground by a resistor 66 and to the output terminal of amplifier 62 by a further resistor 68. An integrating capacitor 70 is coupled in series with a low-value resistor 72, and the series combination is coupled between the output of amplifier 62 and the inverting input. The output of integrator 60 is applied through a resistor 74 to the control input of AGC amplifier 20 for forming a degenerative feedback loop by which the video signals coupled to detector 50 are maintained at a relatively constant amplitude. The output signal of integrator 60 is also coupled by way of a resistor 76 to the control input of controllable-gain video amplifier 40. Controllable amplifier 40 includes an amplifier 41 which may be of operational type and a feedback resistor 42 coupled between the output of amplifier 41 and its inverting (−) input. Feedback resistor 42 operates in conjunction with the main conduction path of a field-effect transistor 43 and a resistor 45 to control the overall amplification of controllable amplifier 40. A resistor 44 couples the noninverting input of amplifier 41 to ground and forms with resistor 34 a voltage divider for attenuating video signals applied to the noninverting input of amplifier 41. The control signal applied through resistor 76 is coupled to the gate of transistor 43. The gate of transistor 43 is also coupled to ground by capacitor 46 to aid in noise reduction and to B− by a resistor 47 for bias.

Controllable-gain amplifier 40 amplifies the video coupled to its noninverting input terminal from transistor 24 in an amount determined by the control signal coupled to the gate of transistor 43. The amplified video signals are coupled to the control input terminal 14 of automatic iris 10.

In operation, resistor 57 may be set for an average response from detector 50. Under such conditions, an average-responsive direct control signals is generated across capacitor 52 and applied to the gate of 43. The gain of amplifier 40 in this instance varies in response to the average level of the video. Iris 10 thus receives average information and processes it in an average manner, so that only overall illumination of the scene affects the iris. If resistor 57 is adjusted for a low resistance to provide a peak-responsive direct control signal across capacitor 52, a single peak in the video signal will produce a large integrated output voltage which will be held for a relatively long interval. This large voltage when applied to the gate of transistor 43 will cause an increase in the gain of amplifier 40 so that the video signals are amplified more after the single transient highlight signal. Thus, the average value of the video signals applied to iris 10 increases in the interval after detector 50 responds to the peak value of a single transient signal. The control circuits within iris 10 process the video and, finding the average value to be greater, close the iris. Thus, iris 10 closes for a relatively long period in response to a single highlight area, just as though it were responsive to the peak value of the video.

The arrangement according to the invention provides a separate automatic control of the iris independent of the control provided with the iris, and is capable of overriding the level set on the iris control as well as changing the mode of response from average to peak.

In a particular embodiment of the invention for use with the aforementioned ES lens with automatic iris, the following values were found to provide satisfactory operation:

| VOLTAGES | |
|---|---|
| B+ +8.5v | B− −5v |

| RESISTORS | |
|---|---|
| 30 | 5600 ohms |
| 42 | 68k |
| 44 | 1200 |
| 47,74,76 | 1M |
| 55 | 10k |
| 57 | 50k |
| 58,64 | 270k |
| 66 | 18k |
| 68 | 110k |
| 72 | 560 |

| CAPACITORS | |
|---|---|
| 32 | .0068μF |
| 46 | 22 |
| 51 | .022 |
| 56,59 | 1.0 |
| 70 | 10.0 |

Other embodiments of the invention will be apparent to those skilled in the art. In particular, a commercial automatic iris having a peak response may be made responsive to average illumination by use of the invention.

What is claimed is:

1. A drive circuit which operates an automatic iris portion of an automatic iris lens assembly which automatic iris portion responds to the average value of a video signal included in an iris control signal coupled to a control terminal thereof for maintaining a constant amplitude of said video signal, comprising:
   image sensing means receiving light from a scene, the intensity of which light is controlled by said iris, said image sensing means producing video signals in response to said light;
   detection means including a peak detection mode, said detection means being responsive to said video signals for producing a direct control signal;
   integrating means coupled to said detection means for integrating said direct control signal to form an integrated control signal;
   wherein the improvement comprises controllable-gain video amplifier means coupled to said integrating means, to said image sensing means and to said control terminal of said automatic iris for controlling the amplitude of video signals applied to said control terminal with a peak responsive mode for providing said averageresponding automatic iris with a peak characteristic.

2. An arrangement according to claim 1, further comprising second controllable-gain video amplifier means coupled to said image sensing means and to said detection means for coupling said video signals to said detection means, said second controllable-gain amplifier further including a control terminal coupled to said integrating means for forming a degenerative feedback loop by which said video signals coupled to said detection means are maintained at relatively constant amplitude.

3. A drive circuit for a television camera automatic iris assembly, which automatic iris assembly responds with a particular time constant to a video signal included in an iris control signal coupled to a control terminal thereof for maintaining a constant amplitude of said video signal, comprising:
   an image sensing means optically coupled to the iris for producing video signals;
   detection means including peak detection and averaging modes, said detection means being responsive to said video signals for producing a control signal;
   integrating means coupled to said detection means for integrating said direct control signal to form an integrated control signal;
   wherein the improvement comprises controllable-gain video amplifier means coupled to said integrating means, to said image sensing means and to said control terminal of said automatic iris for controlling the amplitude of video signals applied to said control terminal for providing said automatic iris assembly with a time constant other than said particular time constant.

* * * * *